INVENTOR.
JIŘÍ HRDINA
BY
Attorney

United States Patent Office 3,508,880
Patented Apr. 28, 1970

3,508,880
APPARATUS FOR CARRYING OUT CHROMATOGRAPHIC ANALYSES OF AMINO ACIDS, THEIR MIXTURES AND SIMILAR MATERIALS
Jiří Hrdina, Prague, Czechoslovakia, assignor to Ceskoslovenska akademie ved, Prague, Czechoslovakia, a corporation of Czechoslovakia
Filed Jan. 6, 1967, Ser. No. 607,818
Claims priority, application Czechoslovakia,
Jan. 7, 1966, 107/66
Int. Cl. G01n 31/08, 31/06
U.S. Cl. 23—253                                  5 Claims

ABSTRACT OF THE DISCLOSURE

Apparatus for chromatographic analysis including one larger column and one smaller column, whose effluents flow through a valve either into an evaluation apparatus or to waste disposal, depending upon the position of the valve. Each column has its own pump for supplying fluid under pressure. In one column, a short regeneration is effected, during which the final stage of the separation of the preceding sample proceeds in the portion of the column downstream from the regeneration zone, while the separation of components of another sample occurs upstream from the regeneration zone.

Figure 1:
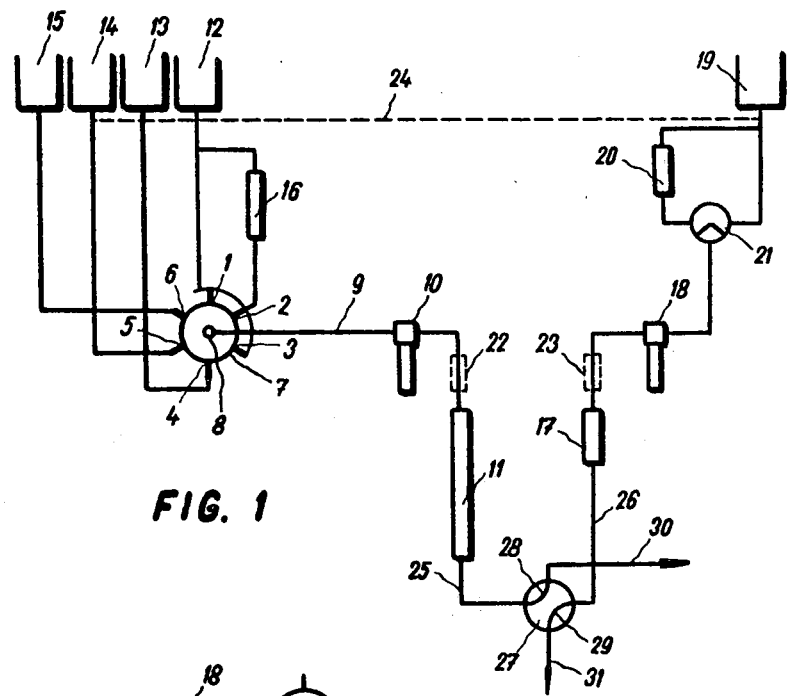

The invention relates to an apparatus for carrying out chromatographic analyses of mixtures of amino acids and similar materials, preferably in a series of repeated analyses and completely automatic.

The invention relates more particularly to an apparatus of the above mentioned type using separate columns for separating basic components and neutral and acidic components. The advantages of this "classical" system devised by Speckman, Moore and Stein in 1958, in which a separate so-called "small column" is used for separating basic amino acids, are known. This system is believed to be preferable in many cases to another known system which operates with one single column for the separation of all amino acids. This latter system has some serious disadvantages, such as the need for a special device to continuously change the eluent quality.

Known analyzers of amino acids use at least three columns. For analyzing mixtures of amino acids, one of these columns, the so called "small" or "basic" column, is shorter than the other two columns. This shorter column serves for separating individual basic amino acids. The other two columns, the so called "large" ones, work alternately so that in one cycle one of them separates the remaining amino acids, that is the acidic and neutral ones, while the other regenerates and restabilizes. In the next cycle the function of the two large columns is interchanged so that the second is used for separation and the first one regenerates and restabilizes.

It is a general object of the invention to reduce the number of columns and pumps in comparison with the known state of art used in semiautomatic analyses.

An advantage of the invention resides in the fact that it carries out analyses of the above mentioned type using only two columns, namely a small one and a single one reducing the total number of columns for a complete analysis from three to two.

Still another advantage resides in the fact that it makes possible in a far simpler way full automation of a series of repeated analyses and automatic transfer of sample to be analyzed from a dosing system into which they are introduced at a suitable time.

As a rule, absolutely perfect balance for regeneration cannot be achieved even after extended regeneration periods. Shortening of regeneration and restabilization to periods permitting the use of only one long column in accordance with the invention permits sufficiently perfect regeneration and restabilization with deviations in the complete analytic cycle which are negligible compared with other inevitable and tolerated deviations from an ideal process.

Hydraulic connection of columns with pumps, hydraulic distributors of buffers and dosing systems, as well as with evaluation devices simplifies the apparatus considerably and saves technical equipment, particularly if the system in accordance with the invention is fully automated.

Still another advantage of the invention is a reduced number of pumps required. The number of pumps is reduced by one or two, or by other pumping and switching equipment required for carrying out the usual regeneration and restabilization on the third column.

The equipment is thus simplified even if the apparatus is not automatic.

But the advantages and simplifications of the apparatus in accordance with the invention are most apparent if the apparatus works fully automatic. Then complete analyses are carried out, including the automatic introduction of a sample into the columns during each of a series of analytic cycles and the transfer of the samples into the columns at the appropriate time. Such total automation can be achieved in systems according to the invention by substatnially simpler means and without loss of accuracy as compared against full automation of the known system using three columns. These advantages are important in analyzers where primary attention is paid to simplicity and speed of action, and also in analyzers of other types, for example where the main stress is on increased accuracy, better separating effect, and the like.

Although the invention can be best used in fully automated processes involving complete series of analyses, it may also be used with advantage where samples are manually transferred to a separating column after opening, and even in the case of manual switching of hydraulic connections like in known types of analyzers.

Stated briefly but more specifically the apparatus in accordance with the invention consists of two columns one of which is of the so called small type and the other of the so called large type. These two columns are connected to the same distributor which connects them intermittently to an evaluation device and a waste. The inlet of each column, respectively, is connected through a dosing device to the outlet of a pump, respectively, and the inlet of the pump of the small column is connected to a container of an elution buffer, the inlet of the pump of the large column being connected to further containers of regenerating solutions.

Figure 2:
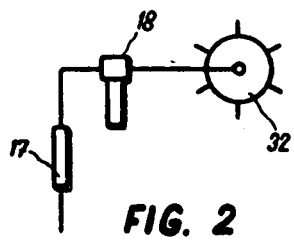
Figure 3:
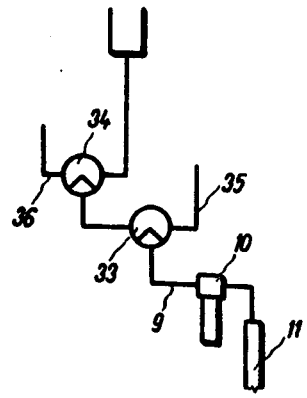
Figure 4:
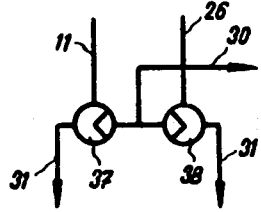
Figure 5:
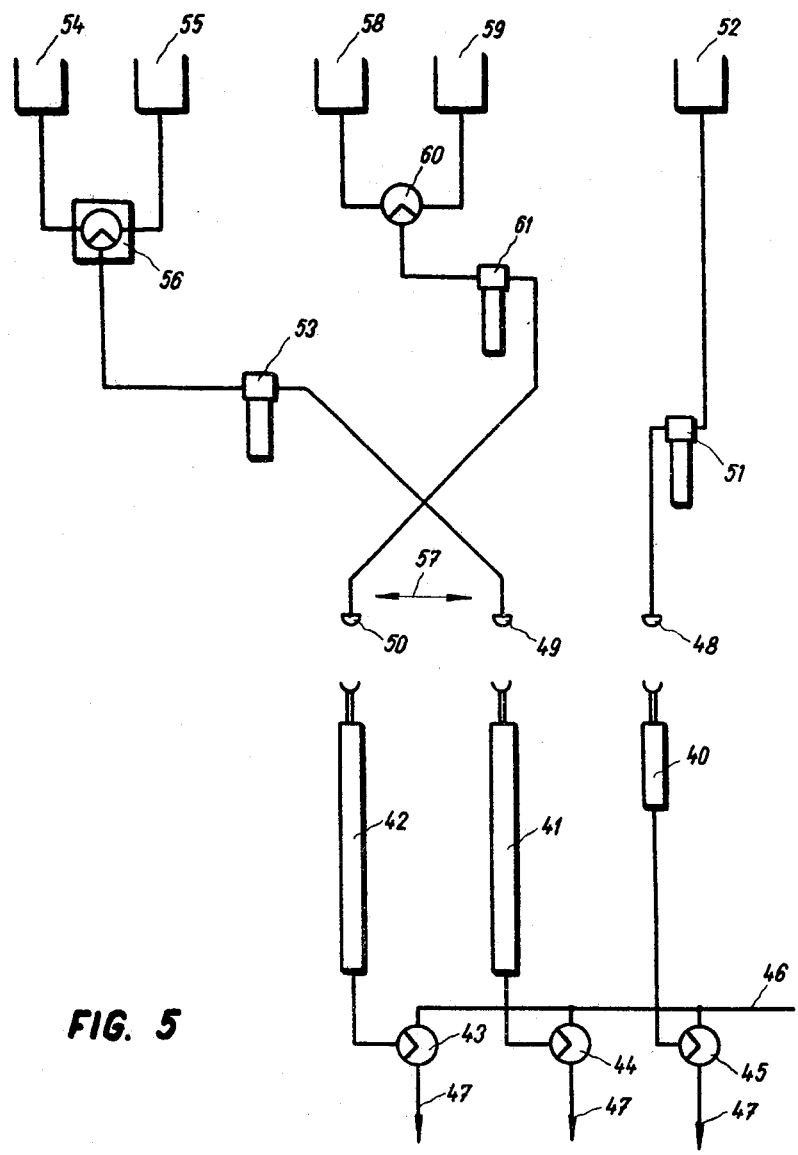

The above mentioned and other features and advantages of the invention will be best understood from the following specification to be read in conjunction with the accompanying drawings, in which:

FIG. 1 illustrates schematically a preferred example of the apparatus in accordance with the invention; and FIGS. 2 to 4 illustrate schematically modifications of details of the apparatus shown in FIG. 1; and FIG. 5 illustrates a known chromatography apparatus using three columns.

Referring now more particularly to FIG. 5 showing an example of the known state of art, it should be understood that this figure illustrates schematically a part of a classical system, sometimes referred to as "fully automated" apparatus. This classical apparatus, however, is automated only in the sense of operating automatically through one cycle of analysis. The apparatus shown in FIG. 5 has a similar purpose in analyzing mixtures and similar materials as the apparatus in accordance with this invention.

This known apparatus comprises a small basic column 40 and two large columns 41, 42 which alternately function as separating or regenerating and stabilizing columns. To achieve as far as possible the same separation on both columns 41, 42 the geometry and fillings of these two columns should be identical as much as possible. This cannot be readily achieved. All three columns 41, 40 and 42, and any further columns in the apparatus are alternately connected by means of manually operated two-way cocks 43, 44, 45, and any further cocks either to the tube 46 leading to the evaluation device, or to the waste 47.

Samples are transferred to all columns 40, 41, 42 manually by means of a pipette after operation on each individual column has been stopped and the liquid content of the ion-changer column has been removed. After further intricate steps including pumping back the sample and its remnants into the resin filling of the column by a washing liquid transferred again manually on the top of the column, the individual columns are again replenished with liquid and closed with a spherical closure 48, 49, 50. During the function of the small column the pump 51 forces the buffer from the container 52 through the closure 48 into the small column. Another pump 53 forces a buffer from the containers 54, 55, through a two-way cock 56 into one of the two large columns 41, 42 through the closure 49 which is connected either to the column 41 or to the column 42 as indicated by the double-arrow 57. While an elution buffer is thus pumped through one column, for example through the column 41, there is passed through the other column, for example through the column 42, at the same time and during an extended period a regenerating solution and thereafter a stabilization buffer from the containers 58 and 59 through a two-way cock 60 by means of a special third pump 61 or another device for securing the necessary overpressure which forces the mentioned solutions through the closure 50 or 49 into the column 42 or 41 and the waste 47. Some known devices use instead of one pump 61 and one change-over cock 60 two pumps or other devices creating an over-pressure above the level of the closed container 58, 59 which secures the flow-through of these solutions progressively through one of the large columns 41, 42 while the other performs the separating function.

Referring now to FIG. 1 it can be seen that peripheral branches 1 to 6 of an automatic six-way distributor 7 can be joined to a central branch 8 connected by means of a tubing 9 to a pump 10 which forces the eluents into a single large column 11. The peripheral branches 1 to 6 of the distributor 7 are connected to the containers 12, 13, 14, 15 of the elution solutions, the branches 1 and 3 being interconnected and joined directly to the container 12 of the first elution buffer, while the branch 2 placed therebetween is joined to the same container 12 through non-pressurized dosing system 16.

In a similar manner the eluent is forced into a small column 17 by the pump 18, the eluent being drawn from the container 19 either directly or through an automatic three-way cock 21 if a non-pressurized dosing device 20 is used. In one position this cock 21 connects the pump 18 to the container 19 directly, and in the second position through the non-pressurized dosing system 20. The other non-pressurized dosing system 16 for the large column 11 and the non-pressurized dosing system 20 for the small column 17 can be replaced by the pressurized dosing systems 22 and 23 indicated by dashed lines. These systems, if used, are positioned closely in front of the columns 11 and 17. In this case the branch 2 of the multiway distributor 7 can be joined to a non-illustrated container of a further elution solution, or the number of branches may be reduced by two. If, for example, only two elution solutions are used, always two opposite branches of the illustrated automatic six-way distributor 7 may be interconnected. In this case one analytic cycle requires only three steps of the core of the six-way distributor 7 instead of six. If a pressurized dosing system 23 is used instead of the non-pressurized dosing system 20, the three-way cock 21 may be omitted. The same applies of course if manual dosing into the columns is to be used; dosing devices are then, of course, completely omitted. The advantage of non-pressurized dosing systems in comparison with pressurized dosing systems resides in a minimum of sealing requirements.

The known system for carrying out analyses on one small and two large columns uses for elution of the large columns two citrate elution buffers with an acidity pH 3.25 and pH 4.25 and a normality N/0.2, and for regeneration NaOH with a normality N/0.2. A single citrate buffer with an acidity pH 5.28 and a normality 0.35 is used for the small column. The apparatus in accordance with the invention may use the same buffers and regeneration solution as the known apparatus. It achieves a shortening of the elution period on a single large column and better separation of thyrosine and phenylalanine which are amino acids which are difficult to separate by using for the single large column a third elution buffer with a higher acidity and normality than those of the first two buffers. This third buffer for the single large column may be identical with the elution buffer for the small column. If the relevant tubings are interconnected, as shown in FIG. 1 by the dashed line 24, one of the two containers 14 or 19 may be omitted thereby supplying an elution buffer of substantially higher normality of a substantially higher pH value from a common source both to the large column 11 and to the small column 17.

The eluates flowing out from the columns 11 and 17 are lead by the capillary tubings 25 and 26 to a hydraulic distributor 27 whose rotary core is provided with two ports 28, 29 which cooperate with the tubings 25 and 26 so that if one is connected to the supply tubing 30 leading to the evaluation device, the second is connected to the waste 31, and vice versa. The hydraulic distributor 27 may be operated manually like the hydraulic distributors 7 and 21 if the apparatus is not to be automated. A particular advantage of the system in accordance with the invention resides in the fact that all three hydraulic distributors can be readily readjusted automatically by order from a central programming device not illustrated in FIG. 1. Total automation including automatic transfer of sample from the dosing systems to the columns can be achieved by very simple means as follows from the simplified total arrangement in comparison with the known state of art.

It is an advantage that manual operation of the entire analytical system according to FIG. 1 is possible even if the system is automatic. This secures operation even in the case of a breakdown of the automatic system or if for some reason an individually conducted process is to be carried out deviating from the automatically programmed process. To this end the hydraulic distributors 7, 21 and 27 may be conveniently designed so that they can also be manually readjusted even if the apparatus is set to automatic control.

The hydraulic distributor 27 directs the eluate flowing out of the columns 11 and 17 into the tubing 30 to the evaluation device at moments when it carries with it the separated components whose separation has been achieved on the respective column. This permits the entire evaluation device to be permanently used for evaluating the eluate from either of the two columns 11 or 17. After switching over, the eluate from one column drives in front of it the eluate which has been flowing into the evaluation device for about 15 minutes before the switching over. The large column 11 is operated so that at the time when the eluate is led from the small column 17, elution is being completed on the large column 11 particularly by the third elution buffer. There also takes place a short regeneration and repeated stabilization with a buffer which may be conveniently identical with the first elution buffer. Thus, at the time when the eluate is led from the small column 17 into the evaluation device, elution of the preceding analysis on the large column 11 and its regeneration and restabilization are completed. On the small column 17 there takes place, before its eluate is switched over to the evaluation device, elution of acidic and basic amino acids in a substantially unseparated state into the waste 31 before the moment of switching over. After establishing communication between the evaluation to the large column 11 by means of the valve 27, the eluate from this column causes the amino acids separated on the small column 17 to flow into the evaluation device. In some cases it is convenient if the small column 17 is regenerated after each analytical cycle, or if elution on it is carried out by more than one elution solution.

FIG. 2 shows schematically a modification of some details of the apparatus. The three-way cock 21 is replaced by a cock 32 with more than three ways. Its circumferential branches are connected by non-illustrated means on the container with the respective solutions in a similar manner like when the hydraulic distributor 7 shown in FIG. 1 is used. Such a complicated elution on the small column 17, eventually with regeneration, is convenient or necessary in cases of more complicated mixtures which contain further materials in addition to fundamental amino acids.

For various types of analyses, more particularly of more complicated mixtures of amino acids occurring in hydrolysates of proteins and peptides, it is convenient to use another small column than the one used for separating basic amino acids of simple mixture consisting only of fundamental amino acids.

FIG. 3 illustrates schematically how the hydraulic multiway distributor 7 can be replaced by two or more two-way distributors 33, 34 and others; if these switches are connected in series they work in a similar manner like the arrangement in FIG. 1. For example, the tubing 35 may be connected either to a non-pressurized dosing system like the system 16 in FIG. 1 or directly to any of the containers 12 to 15 of the elution solution. Similarly, the tubing 36 may connect the two-way distributor 34 to another distributor, or directly to another container of the respective solution. In a similar manner it is also possible to achieve the functions in accordance with FIG. 2 for a small column by means of a hydraulic distributor 32 with more than three ways.

FIG. 4 illustrates schematically a modification of the detailed arrangement of two two-way cocks 37, 38 which may replace the function of the hydraulic distributor 27 in FIG. 1 for switching over.

Comparison between the apparatus illustrated in FIGS. 1 and 5 shows that for the automatic function the apparatus according to FIG. 5 is more complicated than the apparatus according to FIG. 1 which performs separation of mixtures of amino acids and similar materials with a substantially higher efficiency and at various degrees of automation up to complete automation. It can be seen that the apparatus according to the invention uses a smaller number of columns, that is two instead of three, but also a smaller number of pumps or switching elements. Automation of the apparatus according to FIG. 5 would require a more complicated automation device than the apparatus according to the invention in FIG. 1.

None of the diagrams illustrated in FIGS. 1 to 5 shows elements serving for evaluation of the eluate which, in addition to the reactor, registering device and other parts contain also one more pump for pumping evaluation reagents.

What we claim is:
1. Apparatus for chromatographic analyses of mixtures of amino acids and similar materials by means of chromatographic eluents and regeneration of the chromatographic column by means of a regenerating liquid, comprising in combination:
   a single large column having an inlet and an outlet,
   a small column having an inlet and an outlet, conduit means for conducting fluids to an evaluation device, conduit means for conducting fluid to waste,
   valve means being movable between a first position and a second position, said outlet of said large column and said small column outlet being independently connected with said valve means, said evaluation device conduit means and said waste conduit means being independently connected with said valve means, said valve means in said first position connecting said small column outlet with said evaluation device and said large column outlet with said waste, and said valve means in said second position connecting said large column outlet with said evaluation device and said small column outlet with said waste,
   a source of eluent liquid and a source of regenerating liquid, means for conducting liquid from said eluent source and from said regenerating source independently to said large column, a second source of eluent liquid, conduit means for conducting said eluent liquid from said second source to said small column, first pump means in said large column conduit means and second pump means in said small column conduit means, whereby liquid may be independently pumped through one of said columns to waste while liquid from the other column is supplied to said evaluation device.

2. The apparatus according to claim 1 including a multi-way valve interposed between said sources of eluent liquid and regenerating liquid and said large column pump means.

3. The apparatus according to claim 1 including means for inserting a sample to be analyzed into said large column conduit means upstream from said pump means.

4. The apparatus according to claim 1 wherein said source of eluent liquid is divided into a plurality of separate reservoirs, each of said reservoirs being independently connected with said distribution valve means.

5. The apparatus according to claim 4 wherein said source of eluent liquid for said small column is in common with one of said reservoirs.

References Cited

UNITED STATES PATENTS

| | | | |
|---|---|---|---|
| 3,230,048 | 1/1966 | Skeggs | 23—253 |
| 3,334,969 | 8/1967 | Catravas | 23—230 |
| 3,341,299 | 9/1967 | Catravas | 23—230 |
| 3,373,872 | 3/1968 | Hrdina. | |
| 3,399,972 | 9/1968 | Skeggs et al. | 23—253 XR |

MORRIS O. WOLK, Primary Examiner

R. E. SERWIN, Assistant Examiner

U.S. Cl. X.R.

73—61.1; 210—31, 195